(No Model.) 9 Sheets—Sheet 1.

J. E. CRISP & E. F. GRANDY.
LASTING MACHINE.

No. 521,975. Patented June 26, 1894.

WITNESSES
Frank G. Parker.
Frank G. Hatch.

INVENTORS.
Jos. E. Crisp
Edward F. Grandy.

(No Model.)  9 Sheets—Sheet 2.

J. E. CRISP & E. F. GRANDY.
LASTING MACHINE.

No. 521,975. Patented June 26, 1894.

WITNESSES
Frank G. Parker
Frank G. Hattie

INVENTORS.
Jos. E. Crisp
Edward F. Grandy

J. E. CRISP & E. F. GRANDY.
LASTING MACHINE.

No. 521,975. Patented June 26, 1894.

(No Model.) 9 Sheets—Sheet 6.

J. E. CRISP & E. F. GRANDY.
LASTING MACHINE.

No. 521,975. Patented June 26, 1894.

WITNESSES
Frank G. Parker
Frank G. Hattie

INVENTORS
Jos. E. Crisp
Edward F. Grandy (No Model.) 9 Sheets—Sheet 7.

J. E. CRISP & E. F. GRANDY.
LASTING MACHINE.

No. 521,975. Patented June 26, 1894.

WITNESSES.
Frank G. Parker
Frank G. Hattie

INVENTORS.
Jos C Crisp
Edward F. Grandy (No Model.) 9 Sheets—Sheet 8.

J. E. CRISP & E. F. GRANDY.
LASTING MACHINE.

No. 521,975. Patented June 26, 1894.

WITNESSES.
Frank G. Parker
Frank G. Hattie

INVENTORS.
Jos E. Crisp
Edward F. Grandy

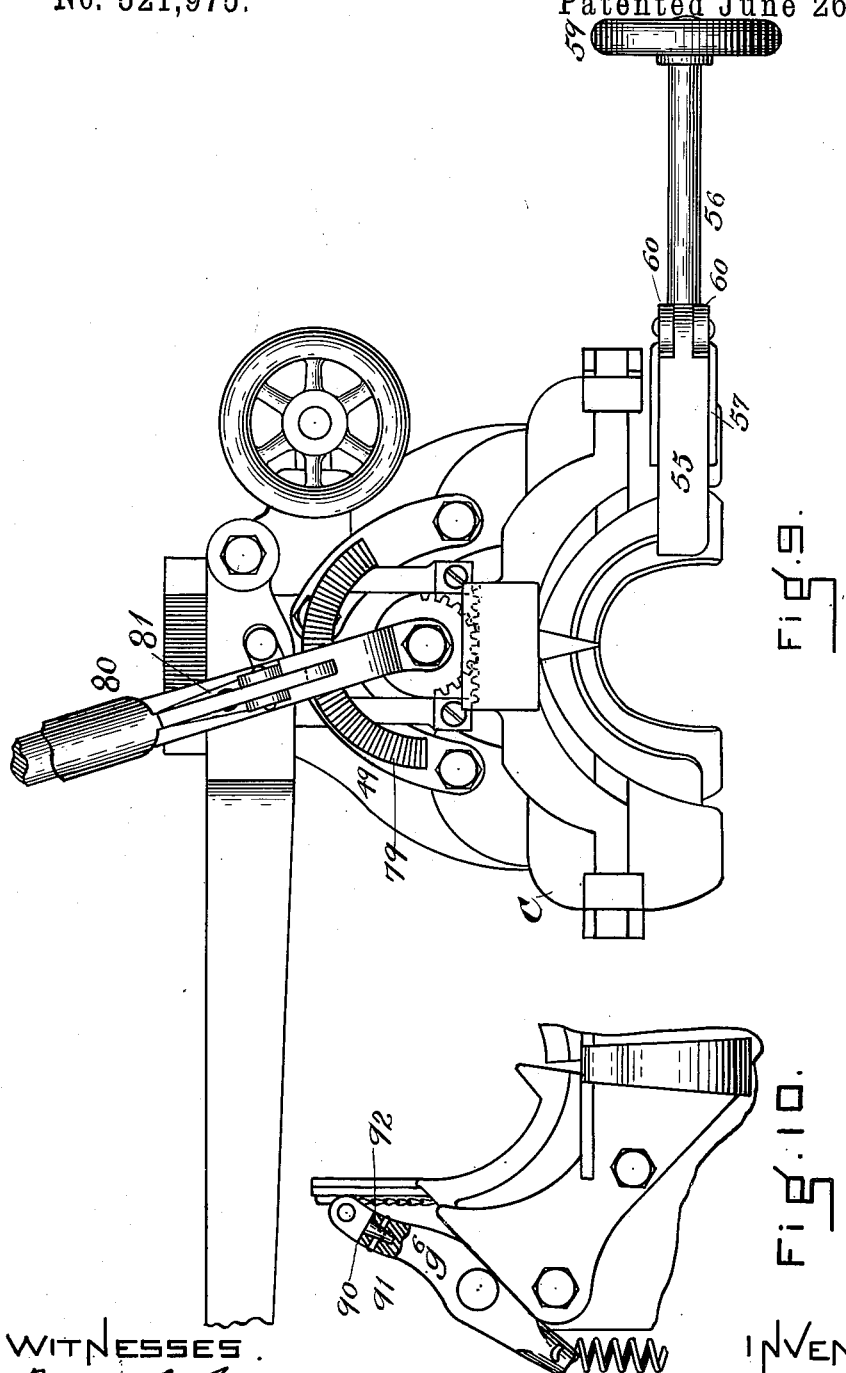

UNITED STATES PATENT OFFICE.

JOSEPH E. CRISP, OF SOMERVILLE, AND EDWARD F. GRANDY, OF EVERETT, MASSACHUSETTS, ASSIGNORS TO THE GOODYEAR SHOE MACHINERY COMPANY, OF PORTLAND, MAINE.

LASTING-MACHINE.

SPECIFICATION forming part of Letters Patent No. 521,975, dated June 26, 1894.

Application filed January 16, 1893. Serial No. 458,605. (No model.)

*To all whom it may concern:*

Be it known that we, JOSEPH E. CRISP, of Somerville, and EDWARD F. GRANDY, of Everett, both in the county of Middlesex and Commonwealth of Massachusetts, citizens of the United States, have invented certain new and useful Improvements in Lasting-Machines, of which the following specification and accompanying drawings are such a full, clear, and exact description as will enable others skilled in the art to make and use the same.

The object of this invention is to facilitate the lasting of heavy uppers, by the substitution of power for manual operations wherever desirable.

This invention relates to improvements upon machines constructed and operated substantially as shown and described in United States Patent No. 465,073, granted December 15, 1891, to George W. Copeland, Joseph E. Crisp and Edward F. Grandy for improvements in lasting machines.

It consists in providing suitable power operating mechanism with a starting treadle and connecting mechanism therefor by which the operator can, by a slight movement of the foot, serially have performed, the most laborious parts of the lasting operations.

It also consists of improved mechanism for drawing the upper close to the shank of the last with any desired force.

It also consists in providing means to insure the location of the last in the machine during certain periods of the lasting operation, and also of mechanism to insure the absolute set position of the toe lasting mechanism.

Figure 1:
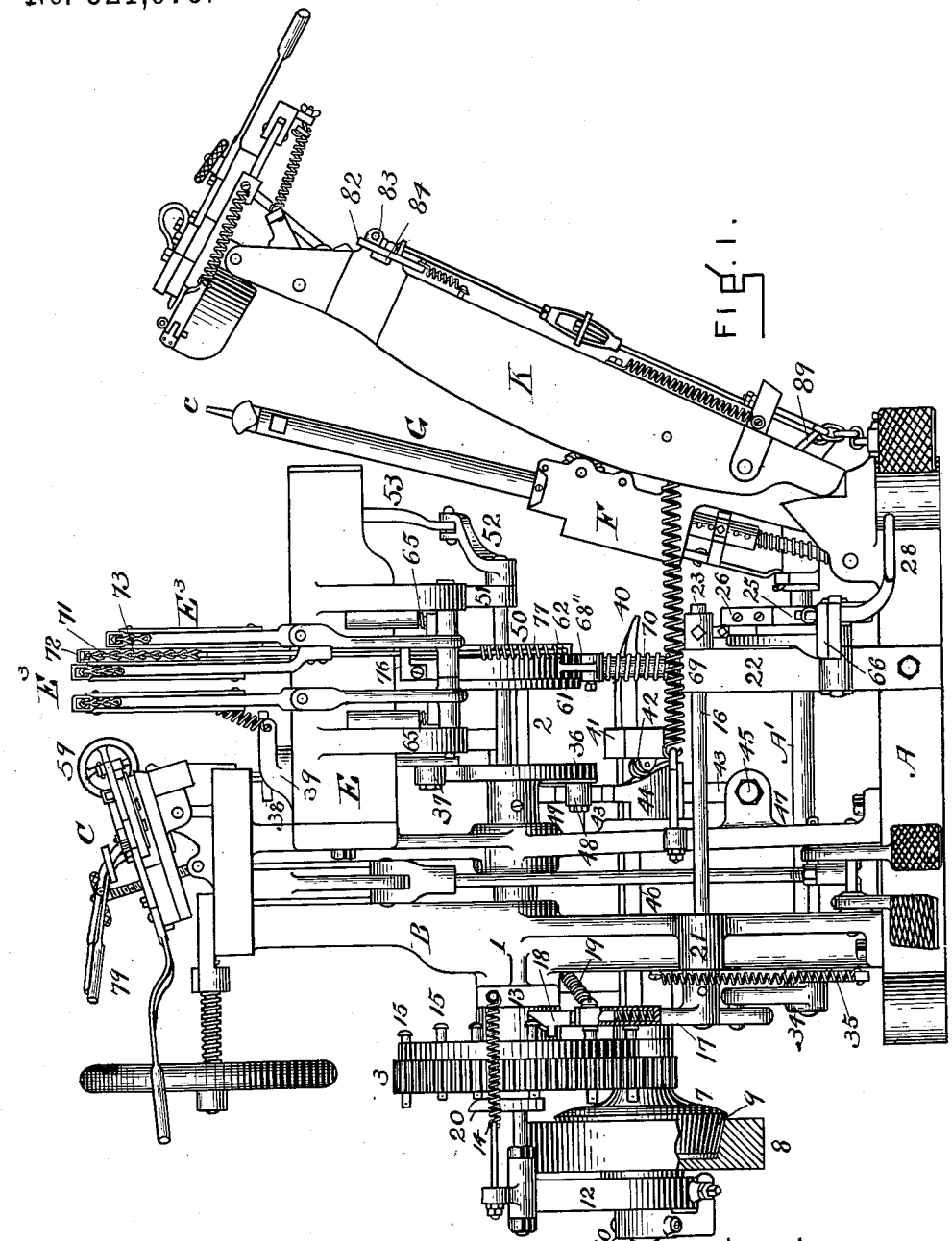
Figure 2:
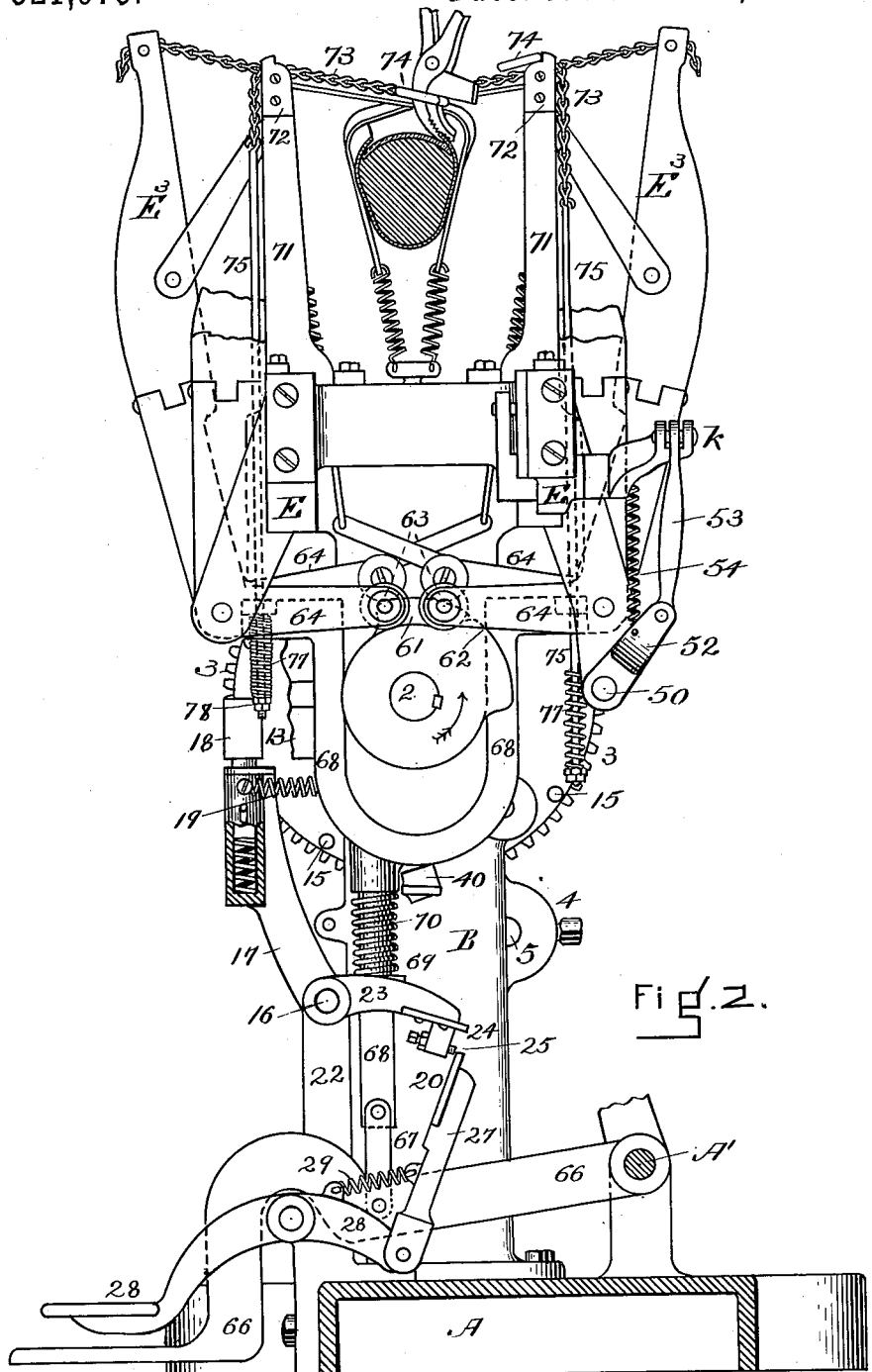
Figure 3:
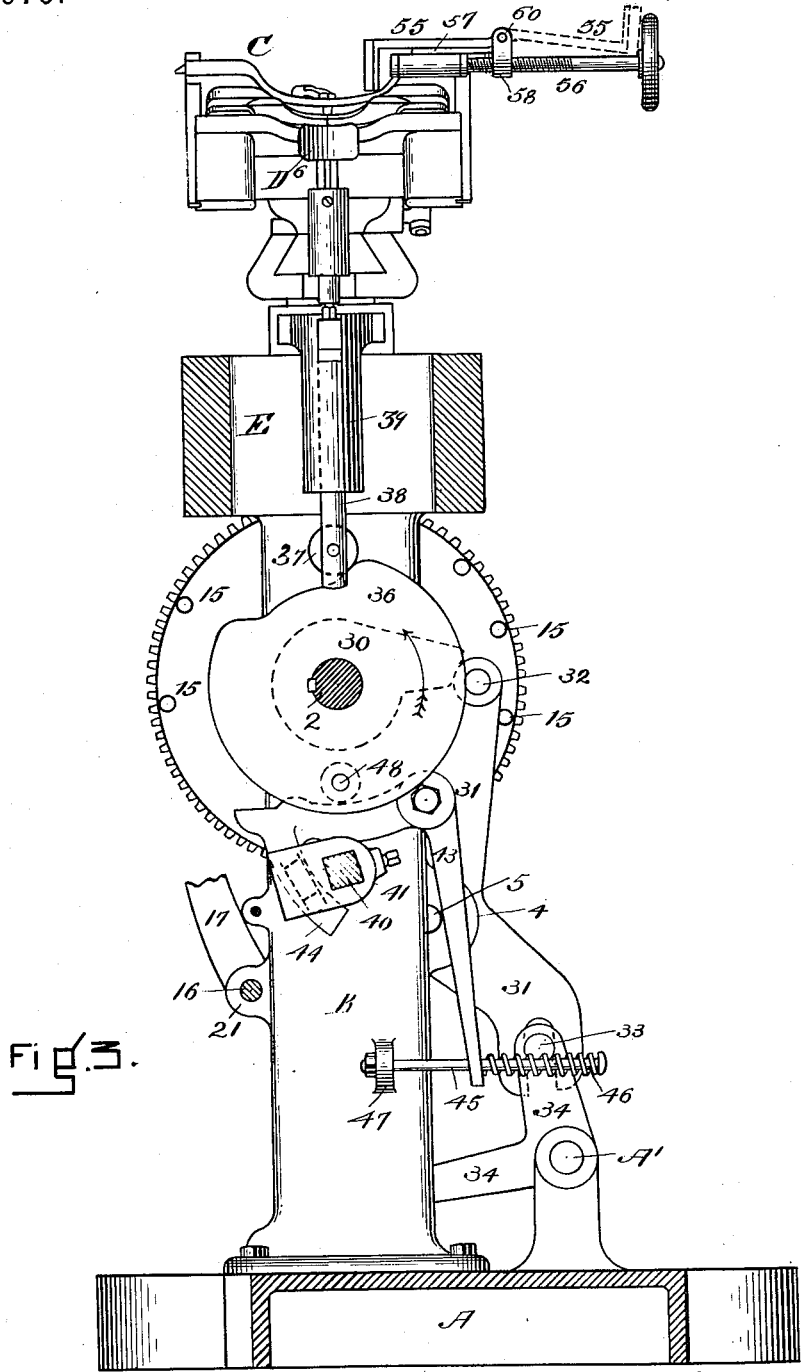
Figure 4:
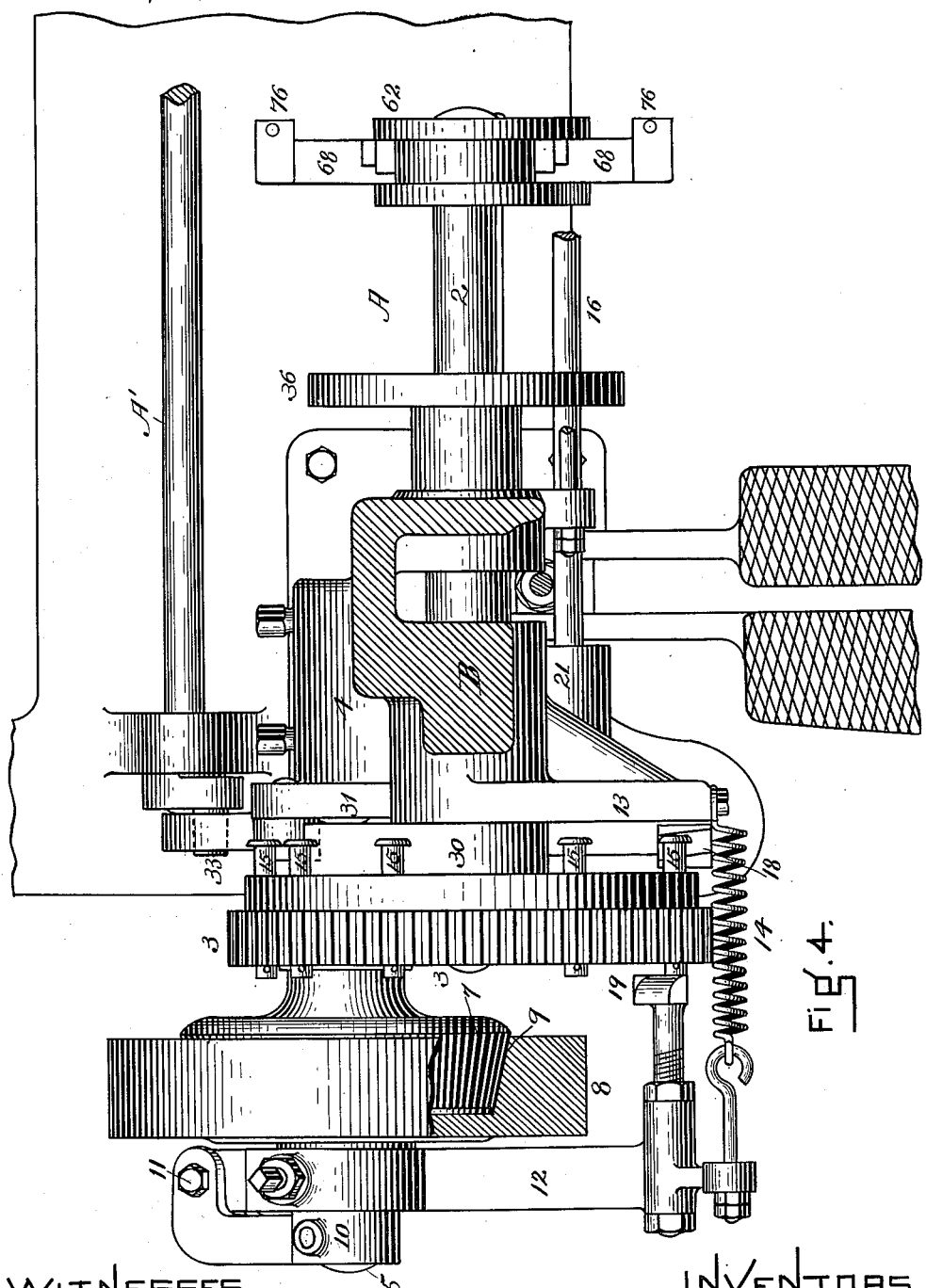
Figure 5:
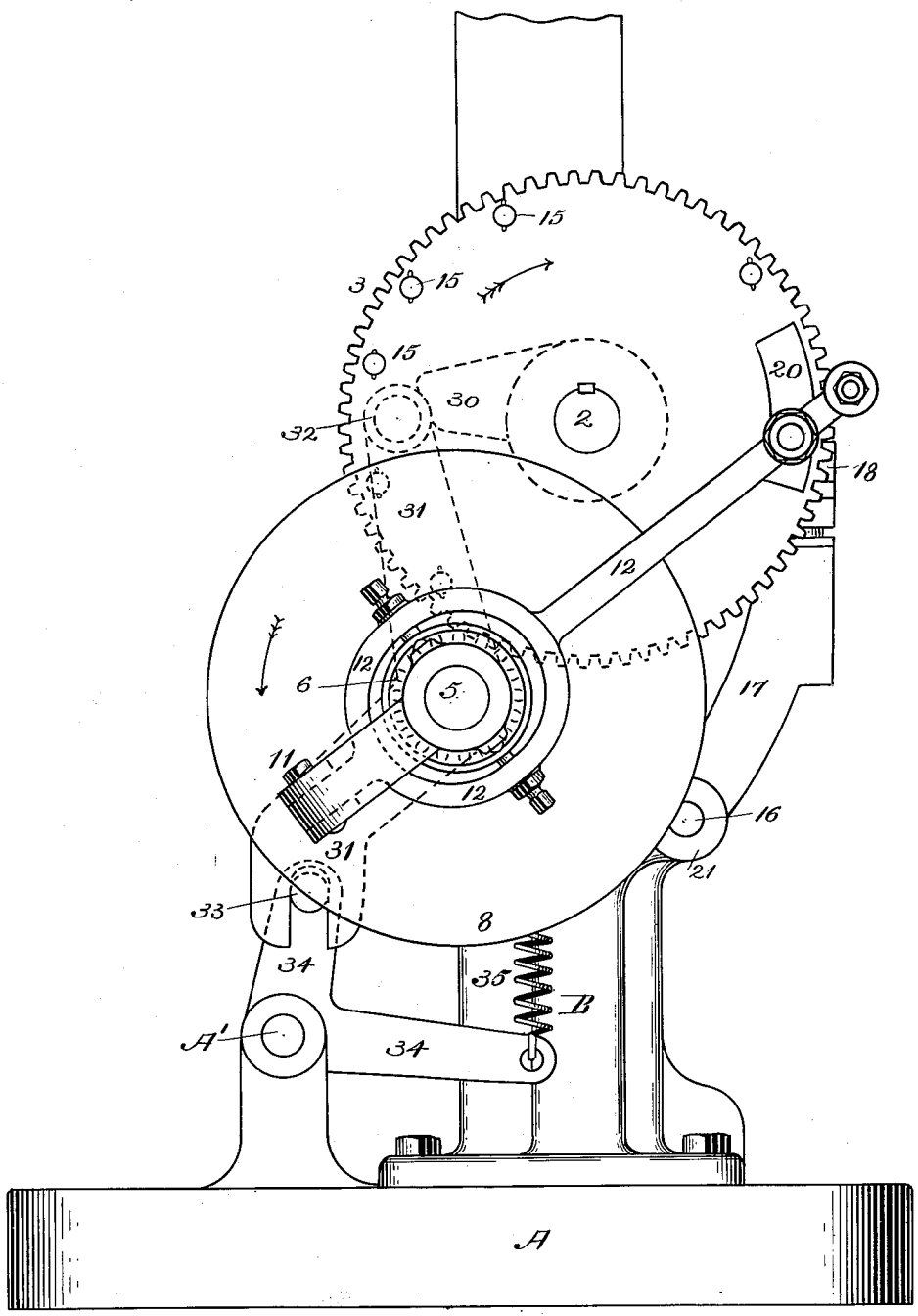
Figure 6:
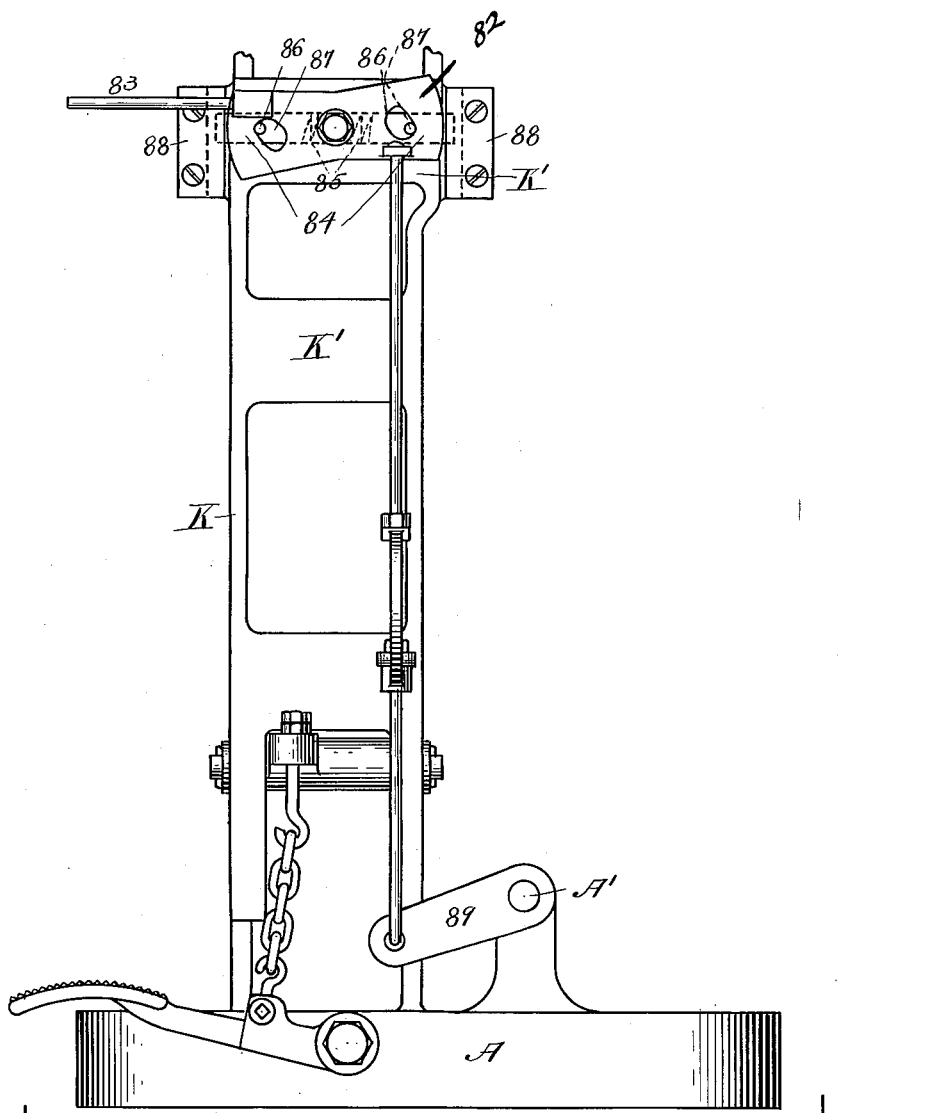
Figure 7:
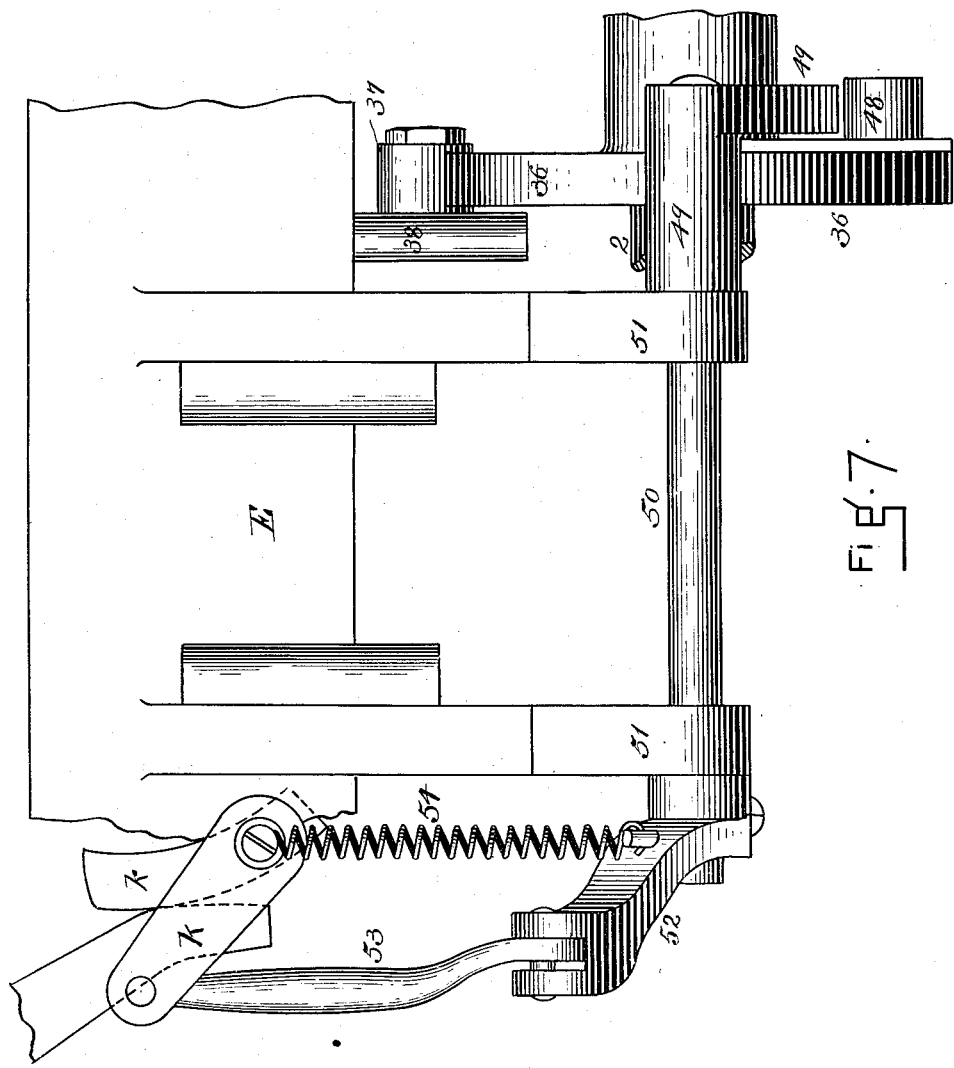
Figure 8:
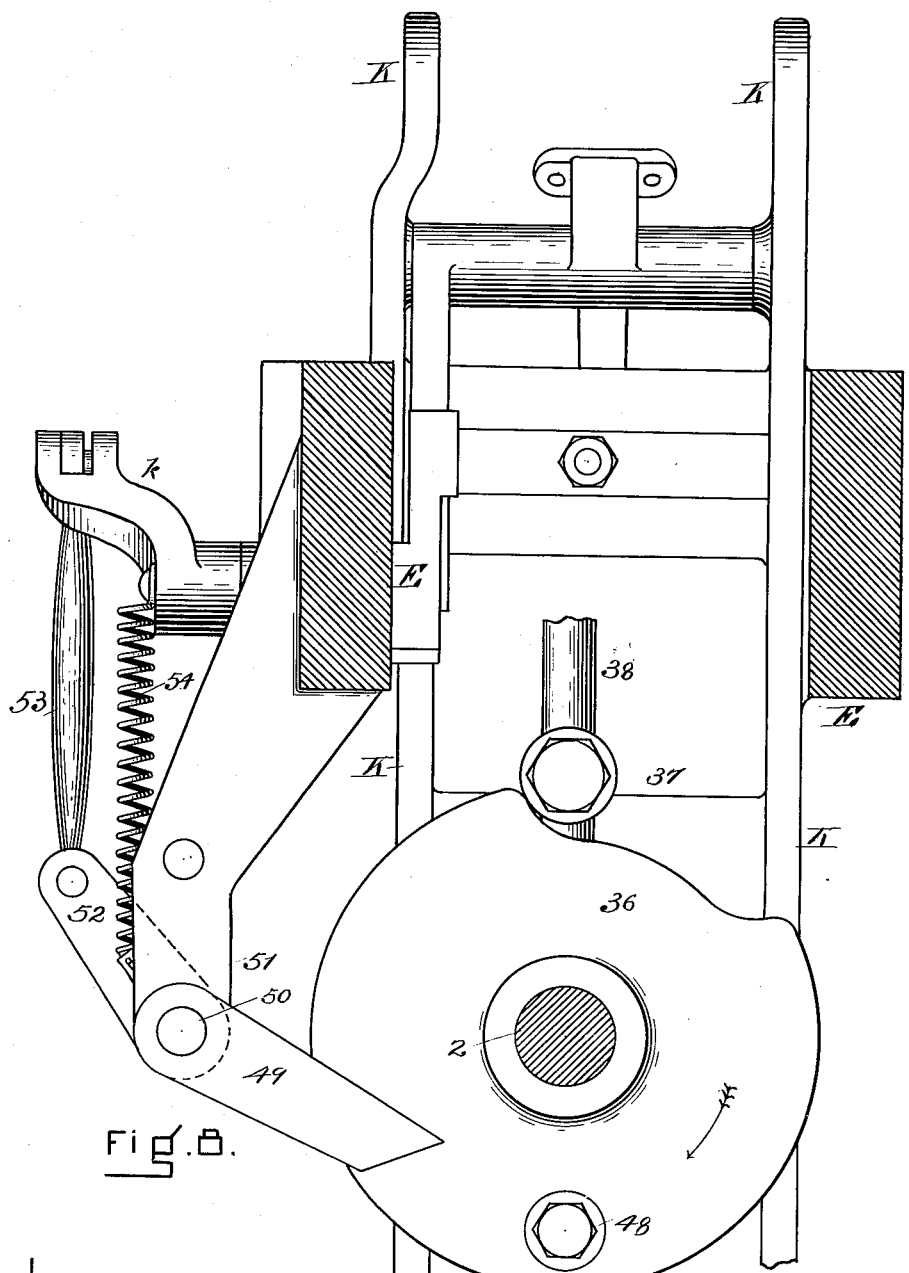

In the drawings Figure 1 is a side elevation of the improved machine in position to receive and deliver lasts. Fig. 2 is a vertical cross section showing the starting treadle and a portion of the mechanism operated thereby, also showing the foot lever and its connecting mechanism by which the operator is enabled to give any desired strain to the shank of an upper. Fig. 3 is a vertical cross section, showing the jacking mechanism, the mechanism for reciprocating the toe-rest, and the removable and adjustable brace, which guides the toe of the last to the correct position upon the toe rest and also holds the same against the stress of the first strap drawn. Fig. 4 is a horizontal cross section, showing the main shaft of the machine and its connecting and operating mechanism. Fig. 5 is an end elevation, showing the driving mechanism. Fig. 6 is an end elevation, showing the mechanism for locking and unlocking the swinging frame carrying the heel-lasting head. Fig. 7 is a side elevation of a portion of the rear horizontal tie, showing the mechanism for operating the heel-lasting band. Fig. 8 is a vertical cross section taken between the supporting post and the first cam on the main shaft, showing an end elevation of the mechanism for operating the heel-lasting band, and the support for the toe rest. Fig. 9 is a plan of the toe-lasting head, showing the removable and adjustable toe centering device and brace, also the improved means for insuring the set position of the double ended wedge, which governs the transverse angular position of the toe-lasting head. Fig. 10 represents the improved construction of the bell crank levers supporting the ends of the heel-lasting band.

In the improved machine, the base, the heel and toe lasting heads, and the side holding devices, with their supporting posts, are substantially the same as in the patent before mentioned, and whenever referred to in the following description will be designated by letters and the improved parts by figures.

The power operating mechanism consists of suitable edge cams fixed to a main-shaft provided with belt operated attachments, which cause the main shaft to move through any desired angle of revolution, each time a starting treadle is depressed. Each of the angles of revolution of the main-shaft produces one of the series of movements necessary to the lasting process, and one full revolution of said shaft from the position shown by Fig. 1, back to said position, brings the machine in position to deliver a lasted, and to receive an unlasted upper.

This power mechanism is constructed and operated as follows: Through the post B at 1, is formed a long bearing, in which revolves the main-shaft, 2, and secured to the outer end of said shaft is the gear, 3, Figs. 4 and 5. In a suitable projection, 4, formed upon the post, B, is fixed the shaft, 5, upon which is mounted the pinion gear, 6, so that it will correctly intermesh with the gear, 3. Fixed to the pinion, 6, is the male part of a friction clutch, 7; these parts are free to revolve upon the shaft, 5, but are fixed endwise. The belt pulley, 8, having formed therein the female part of a friction clutch, 9, is fitted to slide and revolve upon the shaft, 5, and when the two parts of the friction clutch are brought into contact, the main-shaft will revolve. To reciprocate the belt pulley, 8, upon the shaft, 5, there is secured to the outer end of said shaft a piece or collar, 10, to which at 11, is pivoted a shipper-lever, 12. The shipper-lever is attached to the belt-pulley in the usual manner, and its free end is connected to a projection, 13, upon the post, B, by a pull spring, 14. To separate the parts of the friction-clutch and cause the main-shaft to stop in the desired positions, the pins, 15, are fitted to slide free in holes, formed the correct angular distance apart, through the rim of the gear, 3. These distances are irregular and governed by the desired angle of revolution. To one end of a rocker-shaft, 16, there is secured the swinging-arm, 17, carrying elastically mounted in its upper free end the inclined piece, 18, as shown by Fig. 2. The straight side of the inclined piece, 18, bears and slides against the face of the projection, 13, and terminates below the incline in a short straight face, having a square projection therefrom. A pull spring, 19, draws the arm 17, against a suitable stop on the projection, 13. When in this position, the incline, 18, will contact with the inner ends of the pins, 15, and push them toward the shipper lever, 12, as the gear, 3, carries said pins around during its periods of revolution. When the pins, 15, are pushed fully forward, their inner ends will rest upon the projection below the incline and bear against the short straight part thereof. As the gear, 3, continues its revolution, the spring supporting the incline yields vertically, and the outer ends of the pins, 15, contact with the adjustable incline, 20, carried by the shipper lever, and separate the two parts of the friction clutch, and stop the revolution of the main-shaft at the desired angle of revolution.

The elastic mounting of the inclined piece, 18, upon the swinging arm, 17, allows the parts just described to contact without injurious concussion.

The pins, 15, are provided with suitable heads and cross-pins, which prevent them from sliding too far as they are reciprocated in the holes in the rim of the gear, 3. The reciprocations of the pins, 15, are made by contact with the incline, 18, in one direction and by the return motion of the shipper in the other direction.

The rocker-shaft, 16, oscillates in bearings, one formed upon the post, B, at 21, and one formed in the stand, 22, which is secured to the base, A, and fixed to the inner end of this shaft is the swinging arm, 23, Figs. 1 and 2. To the outer end of the arm, 23, there is secured the catch, 24, provided with the adjusting screw, 25, which adjusts the bearing of the end of the dog, 26, upon said catch. The dog, 26, is secured to the free end of the swinging-arm, 27, which is hung upon the inner end of the starting treadle lever, 28, and a pull spring, 29, draws the arm 27, toward the rock-shaft, 16, so that the dog, 26, always contacts with the end of the adjusting screw, 25. The starting treadle, 28, is hung upon the stand, 22, and the weight of the parts attached to the inner end of said treadle are sufficient to elevate the outer end as shown by Fig. 2. Depressing the foot piece of the starting treadle, 28, brings the dog, 26, in contact with the catch, 24, and swings the rocker-shaft, 16, sufficient to move the inclined piece, 18, from under one of the pins, 15. The spring, 14, then draws the two parts of the friction clutch together. When the pin, 15, is clear of the incline, 18, as the foot piece of the starting treadle is further depressed, the adjusting screw, 25, swings the dog, 26, clear of the catch, 24, when the spring, 19, draws the arm, 17, back against its stop. When the main-shaft has moved through the desired angle of revolution, another of the pins, 15, is brought into contact with the incline, 18, and the parts of the friction clutch again separated.

By the above described combination of mechanism, each full depression of the starting treadle, no matter at what speed or how long continued, will give but one resultant motion of the main-shaft.

The normal position of the improved machine is illustrated by Fig. 1, of the drawings, where the machine is shown open, with the jack-post, G, down, ready for a last to be placed upon the jack-pin, c.

The first operation of lasting an upper is to place the last upon the jack-pin, close the machine and lock the swinging frame, K, to the parallel ties, E, raise the toe rest, $D^6$, and jack the last firmly in the machine. The laborious parts of this operation are accomplished by the first angular movement of the main-shaft, as follows: To operate the releasing shaft, A', there is secured to the inner face of the gear, 3, the edge cam, 30, Figs. 1, 3 and 5. A double ended lever, 31, with the cam roll, 32, secured to its upper end, is hung upon the pinion shaft, 5, so that the cam roll, 32, will engage with the edge of the cam, 30. The lower end of the lever, 32, is slotted to engage with the pin, 33, fixed in the bell crank lever, 34, and this lever is fixed upon the releasing shaft A'. The pull spring, 35, is secured to the long arm of the bell crank lever, 34, and to the post, B, so that it will act to reverse the releasing shaft A', when the high part of the cam, 30, is not in contact with the cam roll, 32. These connections cause the releasing shaft A', to reciprocate once at each revolution of the cam, 30, and thus operate the various parts attached thereto, which operate the lock and the jack post. The toe rest, $D^6$, is raised and lowered at the proper times, by the edge cam, 36, which engages with the cam roll, 37, fixed to the support for the toe rest, 38. The support for the toe rest, 38, reciprocates vertically in a suitable guide, 39, formed upon or attached to the parallel ties, E. The lasts are jacked in the machine by the bar, 40, which presses the jack post, G, toward the heel band by contact with the swinging arm, F, and this bar has sufficient range of motion to jack all sizes of lasts. The bar, 40, is fitted to slide free through the post, B, and adjustably fixed upon said bar is the collar, 41, provided with the cam roll, 42. Hung upon a suitable bearing attached to the post, B, is the bell crank lever, 43. One end of this lever, 43, is segmental and has formed upon the segment the incline, 44, which will engage with the roll, 42, and force the bar, 40, toward the jack post as the segment is swung upward. The other end of the lever, 43, is prolonged, and through a hole formed in the outer end thereof is passed the rod, 45, with the push spring, 46, thereon, and the inner end of the rod, 45, is adjustably secured to the lug, 47, formed upon the post, B. The action of the spring, 46, will force the end of the bell crank lever against the lug, 47, which thus forms a stop for the lever's motion in that direction. To compress the spring, 46, and relieve the pressure upon the bar, 40, the upper edge of the segmental end of the bell crank lever, 43, is suitably curved and a cam roll, 48, is correctly located upon the inner face of the cam, 36, so that each time the machine is open, the spring, 46, is compressed, as shown by Fig. 3.

The next operation is to draw the heel-lasting band. This is accomplished by the cam roll, 48, which at the proper time engages with the lever, 49, which is fixed on one end of the rock shaft, 50, Figs. 7 and 8. This rock shaft oscillates in bearings, 51, formed in the rear projections, which branch from the parallel ties, E. To the end of the rock shaft, 50, next the heel band, is fixed the arm, 52, and the connection, 53, operates the bell crank lever, k, to draw the heel lasting band. A pull spring, 54, returns the rock shaft to its normal position when the machine is opened.

In the machine described in Patent No. 465,073, the holding straps are drawn simultaneously in opposing pairs or groups.

In the present machine, it is found advantageous to draw the opposing pairs or groups alternately, commencing with the strap which holds the fore part nearest the operator. The action of this first strap, when being drawn, would tend to move the toe of the last from its central position upon the toe rest, without means were provided to prevent such movement. In the present instance, the removable and adjustable brace, 55, Figs. 1, 3 and 9, is used for that purpose, which is constructed and operated as follows: The adjusting screw, 56, is provided with a suitable bearing in the upper supporting plate of the toe-lasting head, C, and fitted to slide upon the upper face of said plate is the small carriage, 57, having a downward projection, 58, which engages with the thread of the screw, 56, and causes the carriage to reciprocate as the screw is turned by its hand wheel, 59. Two ears, 60, are formed upon the top rear end of the carriage, 57, and between these ears is hung the brace, 55, which has a downward projection, whose inner face is so finished or covered that when brought into contact with the upper upon a last there will be no injurious result. The carriage, 57, is adjusted by the screw, 56, so that the downward projection of the brace, 55, when in operative position, will act to center the toes of the lasts of the style the machine is to operate upon, when said lasts are being fixed in the machine. The brace, 55, is swung from the position shown by the dotted lines in Fig. 3 to that shown by the full lines, to guide the last being placed in the machine, and swung back when the toe lasting plates commence to move over the inner sole. The holding straps are drawn serially by the step by step revolution of the edge cams, 61 and 62, which are fixed upon the main-shaft, 2, and operate the swinging arms, $E^3$, by engaging with suitable cam rolls, 63, connected to said arms by the levers, 64, as shown by Fig. 2. Push springs, 65, placed in suitable pockets, formed upon or attached to the parallel ties, E, over the inner parts of the levers, 65, close in the swinging arms, $E^3$, when the cams, 61 and 62, are in position to allow of such action.

The mechanism, which enables the operator to use the common lasting pinchers and draw the upper at the shank close to the last, by operating a foot lever, is constructed as shown by Figs. 1, 2 and 4.

The foot lever, 66, provided with a suitable foot piece, is hung upon the releasing shaft, A', as shown by Fig. 2. A short connection, 67, connects the lever, 66, to the vertically reciprocating slide, 68, which has a bearing at 69, upon the stand, 22, and is also further guided by the inside faces and hubs of the cams, 61 and 62. A push spring, 70, rests upon the end of the bearing, 69, and raises the slide, 66, and foot lever, 64, when they are not in use. Secured to the parallel ties, E, are the two standards, 71, with a roller mounted on their upper ends, and these rollers are covered by the straps, 72, which guide and keep a cord or chain, 73, in position as it is drawn over the rollers. To the free end of the cord or chain, 73, there are secured the loops, 74, made of sufficient size to readily receive the jaws of a pair of lasting pinchers in the manner shown by Fig. 2. The lower end of the cord or chain, 73, is secured to the rods 75, which in turn pass down through suitable projections 76, formed upon the slides 68, as shown by Figs. 2 and 4. Below the projections 76, the rods 75, are provided with push springs 77, which are retained upon the rods by the check nuts 78. The normal position of the slide 68, is up and that of the loops 74, is horizontal and resting against the straps 72. When the operator desires to strain the shank of the upper on either side of the last, the pinchers are passed through the loop at the opposite side of the machine, and the upper grasped at the desired place as illustrated. This brings the spring 77, about in contact with the under side of the projection 76, of the slide, and requires no great expenditure of force. Depression of the foot lever 66, will then draw the upper across the shank of the last with a strain which is only limited by the tension of the spring 77, which is set to nearly the point of rupture of the upper. The springs 77, allow the foot lever 66, to be depressed by one movement, but said springs can be omitted from the combination by careful manipulation of the foot lever.

With the above described mechanism, the operator can if necessary use both hands to close the pinchers upon a heavy upper, which requires a strong pull, while a very light upper can be drawn over without danger thereto, by graduating the pressure upon the foot lever.

The foot lever 66, and starting treadle 28, are so located that the heel can be used to strain the upper, and the toe to start the main-shaft and draw the holding strap for the same. After the shank holding straps are drawn, the heel and toe lasting mechanism is operated to turn and hold down the upper at those parts, and the fastenings are driven. A last depression of the starting treadle then causes the parts of the machine to return to the positions shown by Fig. 1.

To provide for all changes in the style of lasts, some of which have considerable transverse angle at the toe, the height of the double ended wedge, which controls the set, transverse angular position of the toe lasting head, C, is increased above that shown in the patent hereinbefore mentioned. To keep the range of reciprocation of said wedge within desirable limits, the angles of the ends of the wedge are nearly doubled. This increase of angle makes it requisite that said wedge be positively locked in position, when once set. This is accomplished in the present instance by attaching to the upper supporting plate of the toe lasting head C, the segmental rack 79, provided with square teeth, so that the tops of the teeth will contact with the under side of the hand lever operating the wedge. To the hand lever is pivoted the catch 80, formed integral with its hand piece, and provided with the push spring 81, which acts to press the catch 80, into the spaces formed in the rack 79. This device absolutely prevents motion of the double ended wedge in either direction, and the set rigidity of said wedge cannot be effected by the angle of its ends.

In machines constructed and operated in accordance with Patent No. 465,073, the operation calling for the most muscular effort on the part of the operator was that of depressing the return or releasing treadle $A^2$, which had to be performed twice for each upper lasted. In the present machine, as hereinbefore described, the cam 30, performs the functions of said treadle, and to unlock the swinging frame K, from the horizontal ties E, the lever 89, is fixed to the return shaft $A'$, in the place of the treadle $A^2$. It is desirable that the swinging frame can be unlocked from the horizontal ties without turning the main shaft for that purpose. This is accomplished by substituting for the swinging latch $K^{11}$, the swinging plate 82, provided with the handle 83. A groove is formed in the upper of the stays $K'$ and fitted to reciprocate in said groove are the latches 84, which are pressed outward by the push springs 85. Pins 86 are fixed into the latches, which project through the inclined openings 87, formed through the plate 82, and these pins withdraw the latches 84, from the catches 88, secured to the ends of the horizontal ties E, when the handle 83 is depressed. The pins 86, also limit the motions of the plate, 82, and the latches 84, as will be understood by reference to Fig. 6 of the drawings.

In Patent No. 465,073, the heel supporting band is described as being mounted upon a central pivoted support $g^{14}$, with its ends carried by the inner ends of the bell crank levers $g^6$, to which said ends are loosely pivoted. This gave sufficient adjusting quality to the band on the sides of the counter where the variations of curve were but small. It has been found that, as the transverse inclination of the toe increases, the curves of the sides of the counter usually increase. This calls for increase of motion of the ends of the heel lasting band, which requires more range than can readily be given by loose pivoting the ends of the band to the ends of the bell crank levers. To give the requisite swing to the ends of the band at the sides of the counter, the inner ends of the bell crank levers $g^6$, are separated therefrom at 90 and provided with a suitable pivot 91, which is fitted to the socket 92, formed in the main part of the arms $g^6$, as will be understood by reference to Fig. 10. These additional joints cause all parts of the heel lasting band to conform to counters of all curves.

By the above described combinations of mechanisms, numerous and important advantages are attained, viz:

First. The serial operation of the combined machine by the starting treadle does not require the operator to change his position during the lasting process as heretofore, and the short movement and ease of motion of said treadle reduce to a minimum the labor of operation.

Second. The jacking mechanism is absolutely automatic and requires neither the discretion or labor of the operator therefor.

Third. The centering and holding brace facilitates the positioning of the toe of the last in the machine for the toe lasting process, which in this machine commences at a point below the line of the inner-sole.

Fourth. Drawing the pairs, or groups of pairs, of side lasting straps serially, and commencing such drawing on the side of the last next the operator enables him to work to better advantage.

Fifth. The loops enable the operator to quickly attach the common lasting pinchers to the mechanism, which enables the weight of the body, instead of the strength of the arms, to strain the upper at the shank around the last.

Sixth. The absolute locking of the double ended wedge allows the height of said wedge to be made sufficient to set the angle of the toe lasting head to toes of the largest transverse inclination known, without increasing the labor of setting said head. This also dispenses with the necessity for the springs C', of the former patent.

Having thus fully described the nature, construction, and operation of the improvements, we claim and desire to secure by Letters Patent of the United States—

1. In a lasting machine, the combination with lasting mechanism and a main-shaft with suitable cams for operating said lasting mechanism fixed thereon, of the gear 3 fixed to the main-shaft, the reciprocating pins 15 mounted in the rim of said gear with reference to said operating cams, the incline 18 mounted upon the swinging arms 17, and the incline 20, mounted upon and moving with the clutch shipper lever and suitable supporting and operating mechanism therefor all cooperating to reciprocate the pins 15 with reference to the angular position of the cams fixed upon the main shaft, substantially as and for the purposes described and set forth.

2. In a lasting machine, the combination with lasting mechanism and a main shaft with suitable cams for operating said lasting mechanism fixed thereon, the incline 18, mounted upon the swinging arm 17 and capable of vertical reciprocation thereon, a treadle and suitable connecting mechanism to move said incline and arm to and from operative position, the reciprocating pins mounted in the rim of the driving gear and acting to reciprocate said incline with reference to the operating cams, connecting mechanism, substantially as described between said incline and the driving mechanism to disconnect said driving mechanism from the driven mechanism when said incline is reciprocated substantially as shown and described.

3. In a lasting machine the combination of a centering guide and brace mounted to swing vertically upon its supporting carriage, a supporting carriage horizontally adjustable, and screw adjusting mechanism for said carriage, all mounted upon the toe lasting head substantially as shown and described.

4. In a lasting machine of the class described, the combination of mechanism substantially as described, to draw the opposing pairs or groups of pairs of holding straps alternately and serially, and an adjustable and removable brace, to hold the last in position against the stress of the first drawn strap of the series, substantially as shown and described.

5. In a lasting machine, the combination of standards fixed at each side of the machine, substantially as described, chain guide mechanism at their upper ends located above the surface of the last when fixed in the machine, chains passing through said guides having loops adapted to connect them with the jaws of a pair of lasting pinchers at their free ends, and a treadle and suitable connecting mechanism to operate said loops, substantially as shown and described.

6. In combination with a lasting machine head of the class described, the combination of the transverse adjusting double ended wedge mounted on said head, an operating lever therefor, a catch and spring for said lever, and a segmental rack fixed to said head and engaging with said catch, all substantially as shown and described.

7. In a lasting machine, the combination of the plate 82, mounted to oscillate upon the swinging frame having inclined openings and an operating handle, latches mounted to reciprocate in the swinging frame, springs to press said latches forward, pins fixed in said latches to engage with said plate substantially as described, and catches fixed to the ends of the horizontal ties to engage with said latches and lock the swinging frame in operative position, substantially as shown and described.

8. In a lasting machine of the class described, the combination of the cam 30, fixed to the driving gear, a double ended lever mounted to swing on the pinion shaft and operated by said cam, a bell crank lever fixed to the releasing shaft and operated by the double ended lever, and said releasing shaft, substantially as shown and described.

9. In a lasting machine of the class described, the jacking bar 40, mounted to reciprocate in the post of the machine in line with the jack post, an adjustable collar provided with a cam roll fixed on said bar, a bell crank lever having an inclined segment to engage with said roll pivoted to the post of the machine, an adjustable spring fixed to the frame of the machine and to said lever to operate the jacking bar, a cam shaft mounted to revolve on said post, and a cam roll operated by said shaft to act on said bell crank and react the jacking bar all substantially as described and for the purpose set forth.

10. In a lasting machine, a heel supporting band jointed to the pivots, 91, mounted in the sockets, 92, of the supporting and operating bell crank levers.

JOS. E. CRISP.
EDWARD F. GRANDY.

Witnesses:
FRANK G. PARKER,
FRANK G. HATTIE.